United States Patent
Kaushik et al.

(10) Patent No.: US 12,164,781 B2
(45) Date of Patent: Dec. 10, 2024

(54) SYSTEM AND METHOD FOR MANAGING MEMORY ERRORS IN INTEGRATED CIRCUITS

(71) Applicant: NXP B.V., Eindhoven (NL)

(72) Inventors: Arvind Kaushik, Noida (IN); Nikhil Sharma, Shimla (IN); Rushank Patel, Mahemdavad (IN)

(73) Assignee: NXP B.V., Eindhoven (NL)

( * ) Notice: Subject to any disclaimer, the term of this patent is extended or adjusted under 35 U.S.C. 154(b) by 207 days.

(21) Appl. No.: 17/652,933

(22) Filed: Mar. 1, 2022

(65) Prior Publication Data

US 2023/0280909 A1    Sep. 7, 2023

(51) Int. Cl.
*G06F 3/00* (2006.01)
*G06F 3/06* (2006.01)

(52) U.S. Cl.
CPC .......... *G06F 3/0619* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 4,538,265 A | 8/1985 | Day et al. | |
| 10,216,521 B2 | 2/2019 | Shirvani et al. | |
| 10,908,987 B1 | 2/2021 | Pandey et al. | |
| 2001/0013091 A1* | 8/2001 | Koschella | G06F 9/328 711/165 |
| 2004/0139372 A1 | 7/2004 | Moyer | |
| 2006/0161421 A1 | 7/2006 | Kissell | |
| 2009/0265579 A1 | 10/2009 | Yoshida | |

* cited by examiner

*Primary Examiner* — Midys Rojas

(57) ABSTRACT

An integrated circuit (IC) includes a memory that stores a thread and a processor that generates an instruction request to retrieve one or more instructions of the thread. The IC further includes an error control circuit that receives the instruction request from the processor and retrieves an instruction of the thread from the memory based on the instruction request. Further, the error control circuit determines whether the retrieved instruction is erroneous. Based on the determination that the retrieved instruction is erroneous, the error control circuit provides a substitute instruction to the processor as a response to the instruction request. The substitute instruction is included in an instruction set of the processor. The processor executes the received substitute instruction and suspends an execution of the thread.

26 Claims, 6 Drawing Sheets

SYSTEM AND METHOD FOR MANAGING MEMORY ERRORS IN INTEGRATED CIRCUITS

FIELD OF USE

The present disclosure relates generally to electronic circuits, and, more particularly, to a system and a method for managing memory errors in integrated circuits.

BACKGROUND

In an integrated circuit (IC), a processor executes multiple threads (e.g., sequences of instructions) concurrently by way of context switching. The concurrent execution of multiple threads is referred to as multithreading and is implemented to facilitate sharing of resources (such as the processor) among the threads. The threads and data sets associated therewith are typically stored in a program memory of the IC and a data memory of the IC, respectively. In some cases, the program and data memories experience various errors (referred to as memory errors) that corrupt instructions and data stored therein, respectively. Such erroneous instructions and data lead to an operational failure of the processor (e.g., the processor may experience a hang condition).

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
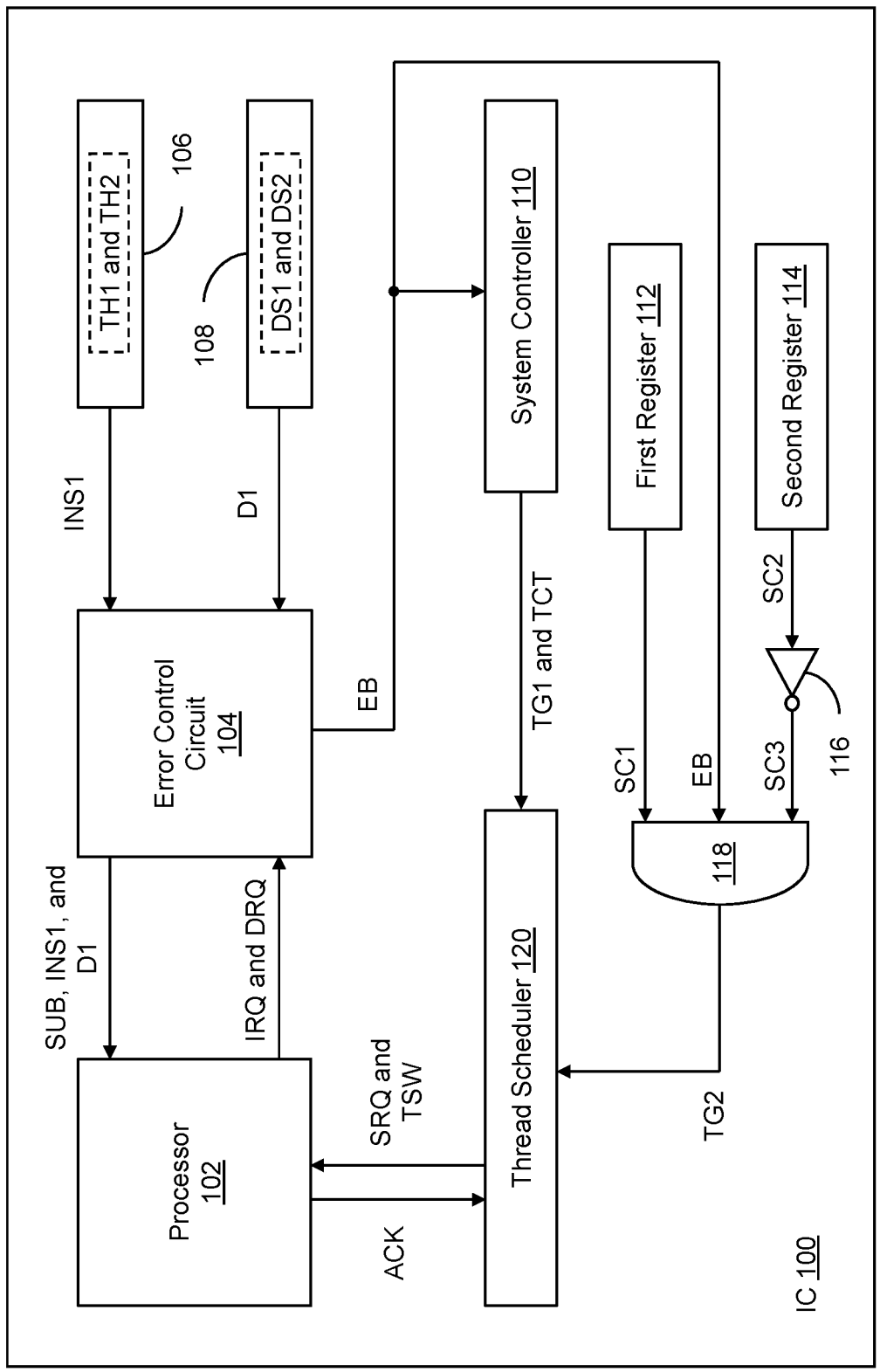
FIG. 1 illustrates a schematic block diagram of an integrated circuit (IC) in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, an integrated circuit (IC) is disclosed. The integrated circuit (IC) may include a first memory, a processor, and an error control circuit that may be coupled to the first memory and the processor. The first memory may be configured to store a first thread. The first thread may include a set of instructions. The processor may be configured to generate an instruction request to retrieve one or more instructions of the set of instructions. Further, the error control circuit may be configured to receive the instruction request from the processor and retrieve a first instruction of the set of instructions from the first memory based on the instruction request. The error control circuit may be further configured to determine whether the first instruction is erroneous. Based on the determination that the first instruction is erroneous, the error control circuit may be further configured to provide a substitute instruction to the processor as a response to the instruction request. The substitute instruction is included in an instruction set of the processor. The processor may be further configured to execute the received substitute instruction. After the execution of the substitute instruction, the processor may be further configured to suspend an execution of the first thread based on the erroneous first instruction.

In another embodiment of the present disclosure, a memory error management method is disclosed. The memory error management method may include storing a first thread by a first memory of the IC. The first thread may include a set of instructions. The memory error management method may further include generating, by a processor of the IC, an instruction request to retrieve one or more instructions of the set of instructions, and receiving the instruction request from the processor by an error control circuit of the IC. Further, the memory error management method may include retrieving a first instruction of the set of instructions from the first memory by the error control circuit based on the instruction request. The memory error management method may further include determining whether the first instruction is erroneous by the error control circuit. Further, the memory error management method may include providing, based on the determination that the first instruction is erroneous, a substitute instruction to the processor as a response to the instruction request by the error control circuit. The substitute instruction may be included in an instruction set of the processor. The memory error management method may further include executing the substitute instruction by the processor. Further, the memory error management method may include suspending, after the substitute instruction is executed, an execution of the first thread based on the erroneous first instruction by the processor.

In yet another embodiment of the present disclosure, an IC is disclosed. The IC may include a first memory and a second memory that may be configured to store a first thread and a data set associated with the first thread, respectively. The first thread may include a set of instructions. The IC may further include a processor and an error control circuit that may be coupled to the processor, the first memory, and the second memory. The processor may be configured to generate an instruction request to retrieve one or more instructions of the set of instructions. The error control circuit may be configured to receive the instruction request from the processor and retrieve a first instruction of the set of instructions from the first memory based on the instruction request. The error control circuit may be further configured to determine whether the first instruction is erroneous and provide the first instruction to the processor as a response to the instruction request based on the determination that the first instruction is error-free. The processor may be further configured to execute the first instruction. Further, the error control circuit may be configured to receive a data request from the processor during the execution of the first instruction, retrieve first data of the data set from the second memory based on the data request, and determine whether the first data is erroneous. Further, the processor may be configured to suspend an execution of the first thread based on the erroneous first data.

In some embodiments, the IC may further include a thread scheduler that may be coupled to the processor. The thread scheduler may be configured to generate, based on the suspension of the execution of the first thread, a thread switching signal for initiating an execution of a second thread associated with the processor. The first memory may be further configured to store the second thread. The thread scheduler may be further configured to provide the thread switching signal to the processor. Further, the processor may be configured to initiate the execution of the second thread based on the thread switching signal.

In some embodiments, the IC may further include a thread scheduler that may be configured to disable the first thread based on the suspension of the execution of the first thread. The disabling of the first thread may correspond to exclusion of the first thread from multithreading associated with the processor.

In some embodiments, the IC may further include a thread scheduler and a system controller that may be coupled to the thread scheduler. The system controller may be configured to correct the erroneous first instruction after the first thread is disabled and generate a thread control bit indicative of the successful correction of the first instruction. Further, the thread scheduler may be configured to receive the thread control bit from the system controller and re-enable the first thread. The re-enabling of the first thread may correspond to inclusion of the first thread in multithreading associated with the processor. Further, to re-enable the first thread, the thread scheduler may be configured to modify a context associated with the first thread.

In some embodiments, the IC may further include a second memory that may be coupled to the error control circuit. The second memory may be configured to store a data set associated with the first thread. Based on the re-enabling of the first thread, the processor may be further configured to receive the first instruction from the error control circuit and execute the received first instruction. The error control circuit may be further configured to receive a data request from the processor during the execution of the first instruction, retrieve first data of the data set from the second memory based on the data request, and determine whether the first data is erroneous. The processor may be further configured to suspend the execution of the first thread based on the erroneous first data.

In some embodiments, the IC may further include a thread scheduler that may be coupled to the processor. The thread scheduler may be configured to generate a suspend request based on the erroneous first instruction and provide the suspend request to the processor. Further, the processor may suspend the execution of the first thread in response to the suspend request.

In some embodiments, the error control circuit may be further configured to generate an error bit. The error bit is asserted based on the determination that the first instruction is erroneous. Further, the suspend request may be generated based on the error bit.

In some embodiments, the IC may further include a system controller that may be coupled to the error control circuit and the thread scheduler. The system controller may be configured to receive the error bit from the error control circuit and determine whether the execution of the first thread is to be suspended based on the assertion of the error bit. The system controller may be further configured to generate a first trigger bit indicating whether the execution of the first thread is to be suspended. The first trigger bit is asserted to indicate that the execution of the first thread is to be suspended. Further, the system controller may be configured to provide the first trigger bit to the thread scheduler. The thread scheduler may generate the suspend request based on the assertion of the first trigger bit.

In some embodiments, the IC may further include a logic gate that may be coupled to the error control circuit and the thread scheduler. The logic gate may be configured to receive the error bit from the error control circuit. The logic gate may be further configured to receive a suspension control bit. The suspension control bit is asserted to indicate that the execution of the first thread is to be suspended when the first thread is erroneous. The logic gate may be further configured to generate a second trigger bit based on the error bit and the suspension control bit. The second trigger bit is asserted based on the assertion of each of the error bit and the suspension control bit. Further, the second trigger bit is de-asserted based on a de-assertion of at least one of a group consisting of the error bit and the suspension control bit. Additionally, the logic gate may be configured to provide the second trigger bit to the thread scheduler. The thread scheduler may generate the suspend request based on the assertion of the second trigger bit.

In some embodiments, the IC may further include a first register that may be coupled to the logic gate. The first register may be configured to store the suspension control bit. The suspension control bit may be stored in the first register during a boot-up of the IC.

In some embodiments, the error control circuit may include a memory controller that may be coupled to the first memory and the processor. The memory controller may be configured to receive the instruction request from the processor and retrieve the first instruction from the first memory based on the instruction request. The memory controller may be further configured to determine whether the first instruction is erroneous and generate an error bit. The error bit is asserted based on the determination that the first instruction is erroneous.

In some embodiments, the error control circuit may further include a multiplexer that may be coupled to the memory controller and the processor. The multiplexer may be configured to receive the first instruction and the error bit from the memory controller. Further, the multiplexer may be configured to receive the substitute instruction. Based on the error bit, the multiplexer may be further configured to provide one of a group consisting of the first instruction and the substitute instruction to the processor. Based on the assertion of the error bit, the substitute instruction may be provided to the processor.

In some embodiments, the error control circuit may include a second register that may be configured to store the substitute instruction. The substitute instruction may be stored in the second register during a boot-up of the IC.

In some embodiments, the first instruction may be erroneous as a result of a memory error in the first memory.

Conventionally, to recover a processor of an integrated circuit (IC) from an operational failure experienced as a result of executing an erroneous thread, either the entire IC may be reset or an IC subsystem that includes the processor may be reset. The reset of the IC subsystem or the entire IC takes up a significant amount of clock cycles. The significant turnaround time associated with the reset of the IC subsystem or the entire IC is undesirable for safety-critical applications (e.g., automotive applications). Further, an error in one thread disrupts the operations of all the other threads that are being executed by the processor. As a result, the throughput of the processor significantly degrades.

Various embodiments of the present disclosure disclose an IC that may include a program memory, a data memory, a processor, an error control circuit, a thread scheduler, and a system controller. The program memory may store various threads (e.g., sets of instructions) and the data memory may store various data sets associated with the threads. The processor may generate an instruction request to retrieve various instructions of a thread and provide the instruction request to the error control circuit. The error control circuit may retrieve an instruction of the thread from the program memory based on the instruction request and determine whether the retrieved instruction is erroneous.

When the retrieved instruction is erroneous, the error control circuit may provide a substitute instruction to the processor as a response to the instruction request. The processor may execute the substitute instruction. Further, based on the erroneous instruction, the processor may suspend an execution of the thread. When the execution of the thread is suspended, the thread scheduler may disable the thread and the processor may initiate an execution of another thread. Thus, the operation of the processor might not be halted as a result of erroneous instructions of one thread. Further, after the thread is disabled, the system controller may correct the erroneous instruction and indicate the thread scheduler to re-enable the thread.

When the retrieved instruction is error-free, the error control circuit may provide the retrieved instruction to the processor and the processor may execute the instruction. During the execution of the instruction, the error control circuit may receive a data request from the processor and retrieve data of one data set from the data memory based on the data request. Further, the error control circuit may determine whether the retrieved data is erroneous. Based on the erroneous data, the processor may suspend the execution of the thread. After the execution of the thread is suspended, the thread scheduler may disable the thread and the processor may initiate the execution of another thread. Thus, the operation of the processor might not be halted as a result of erroneous data associated with one thread. Further, after the thread is disabled, the system controller may correct the erroneous data and indicate the thread scheduler to re-enable the thread.

Thus, the replacement of the erroneous instruction of the thread with the substitute instruction and the suspension of the execution of the thread prevents the operational failure of the processor due to memory errors. As a result, a need to reset the entire IC or an IC subsystem including the processor is reduced. Thus, the IC may be implemented in safety-critical applications (e.g., automotive applications). As the entire IC or the IC subsystem might not be required to be reset, the operations of other threads associated with the processor remain uninterrupted. Consequently, the throughput of the processor of the present disclosure is significantly greater than that of processors that experience operational failures due to memory errors.

FIG. 1 illustrates a schematic block diagram of an integrated circuit (IC) 100 in accordance with an embodiment of the present disclosure. The IC 100 may include a processor 102, an error control circuit 104, a first memory 106, and a second memory 108.

The first memory 106 corresponds to a program memory and may be configured to store a plurality of threads of which a first thread TH1 and a second thread TH2 are shown. The first and second threads TH1 and TH2 may include first and second sets of instructions (not shown), respectively. Each thread stored in the first memory 106 may be associated with the processor 102 (e.g., the processor 102 may execute multithreading based on the plurality of threads). The second memory 108 may correspond to a data memory and may be configured to store a plurality of data sets of which a first data set DS1 and a second data set DS2 are shown. The plurality of data sets may be associated with the plurality of threads and may include data to be utilized during the execution of the plurality of threads. For example, the first and second data sets DS1 and DS2 are associated with the first and second threads TH1 and TH2 and may include various data to be utilized during the execution of the first and second threads TH1 and TH2, respectively. Further, the first and second threads TH1 and TH2 may be available for execution when all data samples of the first and second data sets DS1 and DS2 are stored in the second memory 108, respectively.

The IC 100 may further include a system controller 110, a first register 112, a second register 114, an inverter 116, a logic gate 118, and a thread scheduler 120. The IC 100 may be included in various devices such as automotive devices, battery management devices, mobile devices, networking devices, or the like.

The following table illustrates various signals and data described in FIG. 1:

| Signal/Data | Description |
| --- | --- |
| Instruction request IRQ | Generated by the processor 102 to retrieve one or more instructions of the first thread TH1 |
| First instruction INS1 | Instruction retrieved by the error control circuit 104 from the first memory 106 based on the instruction request IRQ |
| Substitute instruction SUB | Instruction provided by the error control circuit 104 to the processor 102 when an instruction retrieved from the first memory 106 (e.g., the first instruction INS1) is erroneous |
| Error bit EB | Indicates whether the retrieved instruction is erroneous or error-free |
| First trigger bit TG1 | Generated by the system controller 110 to indicate whether an execution of the first thread TH1 is to be suspended or is to remain unaltered when the first thread TH1 is erroneous |
| First suspension control bit SC1 | Stored in the first register 112 during a boot-up of the IC 100 and indicates whether the execution of the first thread TH1 is to be suspended or is to remain unaltered when the first thread TH1 is erroneous |
| Second suspension control bit SC2 | Stored in the second register 114 during the boot-up of the IC 100 and indicates whether the suspension of the execution of the first thread TH1 is determined by the system controller 110 or based on the first suspension control bit SC1 |
| Third suspension control bit SC3 | Inverted version of the second suspension control bit SC2 |
| Second trigger bit TG2 | Generated by performing an AND operation on the first and third suspension control bits SC1 and SC3 and the error bit EB |
| Suspend request SRQ | Generated by the thread scheduler 120 to suspend the execution of the first thread TH1 based on an assertion of the first trigger bit TG1 or an assertion of the second trigger bit TG2 |
| Acknowledgment ACK | Indicative of the successful suspension of the execution of the first thread TH1 |
| Thread switching signal TSW | Indicates the processor 102 to initiate an execution of the second thread TH2 after the execution of the first thread TH1 is suspended |
| Thread control bit TCT | Indicative of the successful correction of the erroneous first instruction INS1 |
| Data request DRQ | Generated by the processor 102 to retrieve data associated with an instruction being executed by the processor 102 |
| First data D1 | Data retrieved by the error control circuit 104 from the second memory 108 based on the data request DRQ |

The processor 102 may be coupled to the error control circuit 104 and the thread scheduler 120. The processor 102 may include suitable circuitry that may be configured to perform one or more operations. For example, the processor 102 may be configured to initiate an execution of a scheduled thread (e.g., the first thread TH1). The first thread TH1 may be scheduled for execution at the processor 102 by the thread scheduler 120. To initiate the execution of the first thread TH1, the processor 102 may be further configured to generate an instruction request IRQ to retrieve one or more instructions of the first thread TH1 (e.g., the first set of instructions). The instruction request IRQ may include one or more addresses of the first memory 106 where the one or more instructions are stored, respectively.

The processor 102 may be further configured to provide the instruction request IRQ to the error control circuit 104. Based on the instruction request IRQ, various instructions (e.g., a first instruction INS1) of the first thread TH1 are retrieved from the first memory 106 by the error control circuit 104. The instructions may be retrieved sequentially. Further, for each retrieved instruction, it is determined whether the instruction is erroneous or error-free. The instruction may be erroneous as a result of a memory error in the first memory 106. The memory error may correspond to an address fault in an address decoder of the first memory 106 or one or more bit-flips in the stored instruction. The memory error in the first memory 106 may be a transient error or a permanent error.

In response to the instruction request IRQ, the processor 102 may be configured to receive, from the error control circuit 104, the first instruction INS1 or a substitute instruction SUB. The substitute instruction SUB is included in an instruction set of the processor 102. The instruction set of the processor 102 includes instructions that are executable by the processor 102. In other words, the substitute instruction SUB is any instruction that does not affect an operation of the processor 102 and does not alter an execution of the associated thread (e.g., the first thread TH1). Examples of the substitute instruction SUB may include a SLEEP instruction, a no-operation instruction, a branch instruction, or the like.

The substitute instruction SUB is received when it is determined that the first instruction INS1 is erroneous. Further, the first instruction INS1 is received when it is determined that the first instruction INS1 is error-free. For the sake of ongoing discussion, it is assumed that the first instruction INS1 is erroneous. In such a scenario, the processor 102 may be further configured to execute the received substitute instruction SUB. The execution of the substitute instruction SUB does not require a data fetch from the second memory 108.

If the erroneous first instruction INS1 is executed by the processor 102, the processor 102 may experience a hang condition or operate in an unpredictable manner. In other words, the execution of the erroneous first instruction INS1 may lead to an operational failure of the processor 102. The memory error in the first memory 106 may thus be referred to as a fatal error. Hence, in the present disclosure, the replacement of the erroneous first instruction INS1 with the substitute instruction SUB prevents the processor 102 from experiencing a hang condition or operating in an unpredictable manner (e.g., prevents the operational failure of the processor 102).

When the first instruction INS1 is erroneous, an execution of the first thread TH1 may be suspended or may remain unaltered. The execution of the first thread TH1 may be suspended if the execution of the substitute instruction SUB instead of the desired instruction hampers the operations of the processor 102 and the IC 100. Conversely, the execution of the first thread TH1 may remain unaltered if the execution of the substitute instruction SUB instead of the desired instruction does not hamper the operations of the processor 102 and the IC 100. For the sake of ongoing discussion, it is assumed that the execution of the first thread TH1 is suspended.

When the execution of the first thread TH1 is to be suspended, the processor 102 may be further configured to receive a suspend request SRQ from the thread scheduler 120. The suspend request SRQ may be generated based on the erroneous first instruction INS1. In response to the suspend request SRQ, the processor 102 may be further configured to suspend the execution of the first thread TH1. In other words, the processor 102 may suspend the execution of the first thread TH1 based on the erroneous first instruction INS1.

The processor 102 may be further configured to generate an acknowledgment ACK based on the successful suspension of the execution of the first thread TH1 and provide the acknowledgment ACK to the thread scheduler 120. In response to the acknowledgment ACK, the processor 102 may be further configured to receive a thread switching signal TSW from the thread scheduler 120. Based on the thread switching signal TSW, the processor 102 may be further configured to initiate an execution of the second thread TH2. In an embodiment, the processor 102 may initiate the execution of the second thread TH2 based on an assertion of the thread switching signal TSW. The operation of the processor 102 thus may not be halted due to a memory error in the first memory 106. To initiate the execution of the second thread TH2, a context switching operation (e.g., replacement of a context associated with the first thread TH1 with a context associated with the second thread TH2) may be performed. The context switching operation may be performed by the processor 102 or the thread scheduler 120. The processor 102 may initiate the execution of the second thread TH2 by generating and providing another instruction request to the error control circuit 104.

After the execution of the first thread TH1 is suspended, the first thread TH1 is disabled. The disabling of the first thread TH1 corresponds to exclusion of the first thread TH1 from the multithreading associated with the processor 102. In other words, the first thread TH1 is unavailable (e.g., is not scheduled) for execution. The first thread TH1 is then re-enabled after the erroneous first instruction INS1 is corrected. The re-enabling of the first thread TH1 corresponds to the inclusion of the first thread TH1 in the multithreading associated with the processor 102. In other words, the first thread TH1 is available (e.g., may be scheduled) for execution.

The error control circuit 104 may be coupled to the processor 102 and the first and second memories 106 and 108. The error control circuit 104 may include suitable circuitry that may be configured to perform one or more operations. For example, the error control circuit 104 may be configured to receive the instruction request IRQ from the processor 102. Based on the instruction request IRQ, the error control circuit 104 may be configured to retrieve various instructions from the first memory 106 in a sequential manner. For example, the error control circuit 104 may be configured to initially retrieve the first instruction INS1 from the first memory 106. Further, the error control circuit 104 may be configured to determine whether the first instruction INS1 is erroneous or error-free. The error control circuit 104 may determine whether the first instruction INS1 is erroneous or error-free by implementing various error detection techniques (e.g., a parity check technique).

Based on the determination that the first instruction INS1 is erroneous, the error control circuit 104 may be further configured to provide the substitute instruction SUB to the processor 102. Alternatively, the error control circuit 104 may be further configured to provide the first instruction INS1 to processor 102 based on the determination that the first instruction INS1 is error-free. Further, the error control circuit 104 may be configured to generate an error bit EB. In an embodiment, the error bit EB is asserted based on the determination that the first instruction INS1 is erroneous. Conversely, the error bit EB is de-asserted based on the determination that the first instruction INS1 is error-free. As it is assumed that the first instruction INS1 is erroneous, the error control circuit 104 may provide the substitute instruction SUB to the processor 102 and generate the error bit EB in an asserted state. Based on the error bit EB, the execution of the first thread TH1 may be suspended or may remain unaltered.

When the execution of the first thread TH1 is suspended, the execution of the second thread TH2 is initiated. In response to the initiation of the execution of the second thread TH2, the error control circuit 104 may be configured to receive another instruction request from the processor 102 to retrieve various instructions of the second thread TH2 from the first memory 106. For each instruction of the second thread TH2, the error control circuit 104 may operate in a similar manner as for the first instruction INS1. Further, after the execution of the first thread TH1 is suspended, the first thread TH1 is disabled, the erroneous first instruction INS1 is corrected, and the first thread TH1 is re-enabled.

The system controller 110 may be coupled to the error control circuit 104 and the thread scheduler 120. The system controller 110 may be a standalone circuit or may be embedded in a core circuit (not shown) of the IC 100. Further, the system controller 110 may be configured to perform one or more operations. For example, the system controller 110 may be configured to receive the error bit EB from the error control circuit 104. As it is assumed that the first instruction INS1 is erroneous, the error bit EB is asserted.

Based on the asserted error bit EB, the system controller 110 may be further configured to determine whether the execution of the first thread TH1 is to be suspended or is to remain unaltered. The system controller 110 may determine that the execution of the first thread TH1 is to be suspended if the execution of the substitute instruction SUB instead of the desired instruction hampers the operations of the processor 102 and the IC 100. Conversely, the system controller 110 may determine that the execution of the first thread TH1 is to remain unaltered if the execution of the substitute instruction SUB instead of the desired instruction does not hamper the operations of the processor 102 and the IC 100. Further, the system controller 110 may be configured to generate a first trigger bit TG1 indicating whether the execution of the first thread TH1 is to be suspended or is to remain unaltered and provide the first trigger bit TG1 to the thread scheduler 120. In an embodiment, the first trigger bit TG1 is asserted when the execution of the first thread TH1 is to be suspended. Conversely, the first trigger bit TG1 is de-asserted when the execution of the first thread TH1 is to remain unaltered.

As the system controller 110 determines that the execution of the first thread TH1 is to be suspended, the first trigger bit TG1 is asserted. Thus, based on the asserted first trigger bit TG1, the execution of the first thread TH1 is suspended. Further, after the execution of the first thread TH1 is suspended, the first thread TH1 is disabled. After the first thread TH1 is disabled, the system controller 110 may be further configured to correct the erroneous first instruction INS1 of the first thread TH1. To correct the erroneous first instruction INS1, the system controller 110 may be further configured to identify if the memory error in the first memory 106 corresponds to the address fault in the address decoder of the first memory 106 or the one or more bit-flips in the stored instruction. When the memory error corresponds to the address fault, the system controller 110 may correct the erroneous first instruction INS1 by moving the correct instruction to a different address in the first memory 106. When the memory error corresponds to the one or more bit-flips in the stored instruction, the system controller 110 may correct the erroneous first instruction INS1 based on error correction code (ECC) data associated with the stored instruction.

The system controller 110 may be further configured to generate a thread control bit TCT indicative of the successful correction of the erroneous first instruction INS1. In an embodiment, the thread control bit TCT is asserted to indicate that the erroneous first instruction INS1 is corrected. The system controller 110 may be further configured to provide the thread control bit TCT to the thread scheduler 120. Further, the first thread TH1 is re-enabled based on the thread control bit TCT.

The first register 112 may be configured to store a first suspension control bit SC1. The first suspension control bit SC1 may be stored in the first register 112 by the core circuit during a boot-up of the IC 100. In an embodiment, the first suspension control bit SC1 is asserted to indicate that the execution of the first thread TH1 is to be suspended when the first thread TH1 is erroneous. Alternatively, the first suspension control bit SC1 is de-asserted to indicate that the execution of the first thread TH1 is to remain unaltered when the first thread TH1 is erroneous.

The second register 114 may be configured to store a second suspension control bit SC2. The second suspension control bit SC2 may be stored in the second register 114 during the boot-up of the IC 100 by the core circuit. In an embodiment, the second suspension control bit SC2 is asserted to indicate that the system controller 110 determines whether the execution of the first thread TH1 is to be suspended. Alternatively, the second suspension control bit SC2 is de-asserted to indicate that whether the execution of the first thread TH1 is to be suspended is determined based on the first suspension control bit SC1 stored in the first register 112.

The inverter 116 may be coupled to the second register 114. The inverter 116 may be configured to receive the second suspension control bit SC2 from the second register 114. Further, the inverter 116 may be configured to generate a third suspension control bit SC3 as an inverted version of the second suspension control bit SC2. Thus, the third suspension control bit SC3 is asserted and de-asserted based on the de-assertion and the assertion of the second suspension control bit SC2, respectively.

The logic gate 118 may be coupled to the error control circuit 104, the first register 112, the inverter 116, and the thread scheduler 120. The logic gate 118 may be configured to receive the error bit EB from the error control circuit 104. Further, the logic gate 118 may be configured to receive the first and third suspension control bits SC1 and SC3 from the first register 112 and the inverter 116, respectively. Based on the error bit EB and the first and third suspension control bits SC1 and SC3, the logic gate 118 may be further configured to generate a second trigger bit TG2. In an embodiment, the logic gate 118 is an AND gate. Thus, the second trigger bit TG2 is asserted based on the assertion of each of the error bit EB, the first suspension control bit SC1, and the third suspension control bit SC3. Conversely, the second trigger bit TG2 is de-asserted based on the de-assertion of the error bit EB, the first suspension control bit SC1, or the third suspension control bit SC3. Further, the logic gate 118 may be configured to provide the second trigger bit TG2 to the thread scheduler 120. The execution of the first thread TH1 may be suspended based on the second trigger bit TG2.

If the first suspension control bit SC1 is asserted and the second suspension control bit SC2 is de-asserted, the execution of the first thread TH1 is to be suspended when the first thread TH1 is erroneous (e.g., when the error bit EB is asserted). On the other hand, if the first and second suspension control bits SC1 and SC2 are de-asserted, the execution of the first thread TH1 is to remain unaltered when the first thread TH1 is erroneous. Further, if the second suspension control bit SC2 is asserted, the system controller 110 determines in real-time whether the execution of the first thread TH1 is to be suspended or is to remain unaltered when the first thread TH1 is erroneous.

The thread scheduler 120 may be coupled to the processor 102, the system controller 110, and the logic gate 118. The thread scheduler 120 may be a standalone circuit or may be embedded in the core circuit of the IC 100. Further, the thread scheduler 120 may be configured to perform one or more operations. For example, the thread scheduler 120 may be configured to schedule the first thread TH1 for execution at the processor 102. During the execution of the first thread TH1, the thread scheduler 120 may be further configured to receive the first trigger bit TG1 from the system controller 110 and the second trigger bit TG2 from the logic gate 118. The first and second trigger bits TG1 and TG2 indicate whether an execution of a thread having an erroneous instruction (e.g., the execution of the first thread TH1 having the erroneous first instruction INS1) is to be suspended or is to remain unaltered.

As the first instruction INS1 is erroneous and the execution of the first thread TH1 is to be suspended, the first trigger bit TG1 or the second trigger bit TG2 is asserted. The first trigger bit TG1 indicates that whether the execution of the first thread TH1 is to be suspended is determined by the system controller 110 in real-time. Conversely, the second trigger bit TG2 indicates that whether the execution of the first thread TH1 is to be suspended is determined based on the first suspension control bit SC1 stored in the first register 112 during the boot-up of the IC 100. Thus, based on the assertion of the first trigger bit TG1 or the second trigger bit TG2, the thread scheduler 120 may be further configured to generate the suspend request SRQ. In other words, the thread scheduler 120 may generate the suspend request SRQ based on the erroneous first instruction INS1 (e.g., the error bit EB). Further, the thread scheduler 120 may be configured to provide the suspend request SRQ to the processor 102. The processor 102 suspends the execution of the first thread TH1 in response to the suspend request SRQ (e.g., in response to the erroneous first instruction INS1).

As a response to the suspend request SRQ, the thread scheduler 120 may be further configured to receive the acknowledgment ACK from the processor 102. The acknowledgment ACK may indicate the successful suspension of the execution of the first thread TH1. Further, the thread scheduler 120 may be configured to disable the first thread TH1 based on the suspension of the execution of the first thread TH1 (e.g., the acknowledgment ACK). The disabling of the first thread TH1 corresponds to the exclusion of the first thread TH1 from the multithreading associated with the processor 102. The thread scheduler 120 may be further configured to generate, based on the suspension of the execution of the first thread TH1, the thread switching signal TSW to schedule a subsequent thread (e.g., the second thread TH2) for execution at the processor 102. Further, the thread scheduler 120 may be configured to provide the thread switching signal TSW to the processor 102. Based on the thread switching signal TSW, the execution of the second thread TH2 is initiated by the processor 102.

The thread scheduler 120 may be further configured to receive the thread control bit TCT from the system controller 110. The thread control bit TCT may indicate that the erroneous first instruction INS1 is corrected. Based on the thread control bit TCT, the thread scheduler 120 may be further configured to re-enable the first thread TH1. The re-enabling of the first thread TH1 corresponds to the inclusion of the first thread TH1 in the multithreading associated with the processor 102.

To re-enable the first thread TH1, the thread scheduler 120 may be further configured to modify the context associated with the first thread TH1. The context associated with the first thread TH1 may be stored in the second memory 108 or an internal memory of the processor 102. The modification of the context may correspond to the modification of a general-purpose register, a floating-point register, a program counter, and a status register associated with the first thread TH1. The modification of the context may result in the execution of the first thread TH1 resuming from an initial instruction of the first thread TH1, from the instruction where the memory error occurred, or any other portion of the first thread TH1. The re-enabling of the first thread TH1 does not affect the operations of the processor 102 and the execution of other threads of the plurality of threads. In other words, the re-enabling of the first thread TH1 does not require a reset of the processor 102 or the IC 100.

In operation, the processor 102 may generate the instruction request IRQ to retrieve the one or more instructions of the first thread TH1. The error control circuit 104 may receive the instruction request IRQ from the processor 102 and retrieve the first instruction INS1 from the first memory 106 based on the instruction request IRQ. Further, the error control circuit 104 may determine whether the first instruction INS1 is erroneous or error-free. As it is assumed that the first instruction INS1 is erroneous, the error control circuit 104 may provide the substitute instruction SUB to the processor 102, and the processor 102 may execute the substitute instruction SUB. The execution of the substitute instruction SUB does not require a data fetch from the second memory 108. Thus, the replacement of the erroneous first instruction INS1 with the substitute instruction SUB prevents the operational failure of the processor 102.

The error control circuit 104 may further generate the error bit EB in an asserted state. The system controller 110 may receive the error bit EB that is indicative of the erroneous first instruction INS1. Based on the erroneous first instruction INS1, the system controller 110 may determine whether the execution of the first thread TH1 is to be suspended or is to remain unaltered and generate the first trigger bit TG1. Further, the logic gate 118 may generate the second trigger bit TG2 based on the first and third suspension control bits SC1 and SC3 and the error bit EB. The first trigger bit TG1 or the second trigger bit TG2 controls whether the execution of the first thread TH1 is to be suspended or is to remain unaltered.

As the execution of the first thread TH1 is to be suspended, the first trigger bit TG1 or the second trigger bit TG2 is asserted. In such a scenario, the thread scheduler 120 may generate the suspend request SRQ and provide the suspend request SRQ to the processor 102. In response to the suspend request SRQ, the processor 102 may suspend the execution of the first thread TH1. Further, the processor 102 may generate the acknowledgment ACK indicative of the successful suspension of the execution of the first thread TH1 and provide the acknowledgment ACK to the thread scheduler 120.

In response to the acknowledgment ACK, the thread scheduler 120 may generate and provide the thread switching signal TSW to the processor 102. Based on the thread switching signal TSW, the processor 102 may initiate the execution of the second thread TH2. During the execution of the second thread TH2, the processor 102 may generate another instruction request to retrieve various instructions of the second thread TH2 and provide the generated instruction request to the error control circuit 104. The error control circuit 104 may process the instruction request associated with the second thread TH2 in a similar manner as the instruction request IRQ associated with the first thread TH1.

In response to the acknowledgment ACK, the thread scheduler 120 may disable the first thread TH1. After the first thread TH1 is disabled, the system controller 110 may correct the erroneous first instruction INS1. Further, the system controller 110 may generate the thread control bit TCT indicative of the successful correction of the erroneous first instruction INS1 and provide the thread control bit TCT to the thread scheduler 120. The thread scheduler 120 may re-enable the first thread TH1 based on the thread control bit TCT. To re-enable the first thread TH1, the thread scheduler 120 may modify the context associated with the first thread TH1.

The re-enabled first thread TH1 may then be scheduled for execution at the processor 102 after the execution of the second thread TH2 is complete. To schedule the first thread TH1 for execution, the thread scheduler 120 may generate and provide another thread switching signal (such as the thread switching signal TSW) to the processor 102. The processor 102 may initiate the execution of the first thread TH1. For example, the processor 102 may regenerate the instruction request IRQ and provide the instruction request IRQ to the error control circuit 104. The error control circuit 104 may again retrieve the first instruction INS1 from the first memory 106 and determine whether the first instruction INS1 is erroneous or error-free. As the first instruction INS1 is corrected, the error bit EB is de-asserted and the error control circuit 104 may be further configured to provide the first instruction INS1 to the processor 102 for execution. In such a scenario, the execution of the first thread TH1 remains unaltered.

During the execution of the first instruction INS1, the processor 102 may be further configured to generate a data request DRQ to retrieve associated data of the first data set DS1 from the second memory 108. The data request DRQ may include one or more addresses associated with the data required for executing the first instruction INS1. Further, the error control circuit 104 may be configured to receive the data request DRQ from the processor 102 during the execution of the first instruction INS1 and retrieve first data D1 of the first data set DS1 from the second memory 108 based on the data request DRQ.

The error control circuit 104 may be further configured to determine whether the first data D1 is erroneous or error-free. The first data D1 may be erroneous as a result of a memory error in the second memory 108. The memory error may correspond to an address fault in an address decoder of the second memory 108 or one or more bit-flips in the stored data. For the sake of ongoing discussion, it is assumed that the first data D1 is erroneous. In such a scenario, the error control circuit 104 may generate another error bit (such as the error bit EB) in an asserted state and provide the first data D1 to the processor 102.

Based on the erroneous first data D1, the processor 102 may be further configured to suspend the execution of the first thread TH1 in a similar manner as described above. For example, the system controller 110 may determine whether the execution of the first thread TH1 is to be suspended or is to remain unaltered and generate and provide a third trigger bit (not shown) to the thread scheduler 120. The IC 100 may further include another logic gate (not shown) that operates in a similar manner as the logic gate 118, and may be configured to generate a fourth trigger bit (not shown). Based on an assertion of the third trigger bit or an assertion of the fourth trigger bit, the thread scheduler 120 may generate and provide another suspend request (such as the suspend request SRQ) to the processor 102. The processor 102 may thus suspend the execution of the first thread TH1.

After the execution of the first thread TH1 is suspended, the processor 102 may initiate the execution of a subsequent thread (e.g., the second thread TH2) and the thread scheduler 120 may disable the first thread TH1 in a similar manner as described above. For example, after the execution of the first thread TH1 is suspended, the processor 102 may generate and provide another acknowledgment (such as the acknowledgment ACK) to the thread scheduler 120. In response, the thread scheduler 120 may generate and provide the thread switching signal TSW to the processor 102 for initiating the execution of the second thread TH2. Additionally, the thread scheduler 120 may disable the first thread TH1.

After the first thread TH1 is disabled, the erroneous first data D1 may be corrected and the first thread TH1 may be re-enabled in a similar manner as described above. For example, after the first thread TH1 is disabled, the system controller 110 may correct the erroneous first data D1. Further, the system controller 110 may generate and provide another thread control bit (such as the thread control bit TCT) to the thread scheduler 120. In response, the thread scheduler 120 may re-enable the first thread TH1.

When the re-enabled first thread TH1 is again scheduled for execution at the processor 102, the processor 102 may regenerate the instruction request IRQ and provide the instruction request IRQ to the error control circuit 104. In such a scenario, as the first instruction INS1 and the first data D1 are corrected, the execution of the first instruction INS1 may be successful. Further, after the first instruction INS1 is executed successfully, the error control circuit 104 may retrieve a subsequent instruction of the first thread TH1 from the first memory 106 and determine whether the retrieved instruction is erroneous or error-free. Thus, each remaining instruction of the first thread TH1 may be executed in a manner similar to the first instruction INS1.

Memory errors in other threads (e.g., the second thread TH2) and data sets associated with the threads (e.g., the second data set DS2) may be managed in a similar manner as described above.

Variations in the IC 100 of FIG. 1:

In a first variation, the first instruction INS1 may be error-free instead of being erroneous. In such a scenario, the error control circuit 104 may be configured to provide the first instruction INS1 to the processor 102 instead of the substitute instruction SUB. Further, the processor 102 may be configured to execute the first instruction INS1 in a similar manner as described above. Additionally, the processor 102 may be configured to receive other instructions of the first thread TH1 if the instructions are error-free and execute the received instructions.

In a second variation, the first data D1 may be error-free instead of being erroneous. In such a scenario, the error control circuit 104 may provide the first data D1 to the processor 102 and retrieve a subsequent instruction from the first memory 106.

In a third variation, it may be determined that the execution of the first thread TH1 is to remain unaltered when the first instruction INS1 or the first data D1 is erroneous. In both scenarios, the error control circuit 104 retrieves a subsequent instruction of the first thread TH1 from the first memory 106.

In a fourth variation, for each erroneous instruction other than the first instruction INS1, the error control circuit 104 may provide a different substitute instruction.

In a fifth variation, the IC 100 may include additional registers for storing the first trigger bit TG1 and the thread control bit TCT. In such a scenario, the thread scheduler 120 may receive the first trigger bit TG1 and the thread control bit TCT from the registers.

Figure 2:
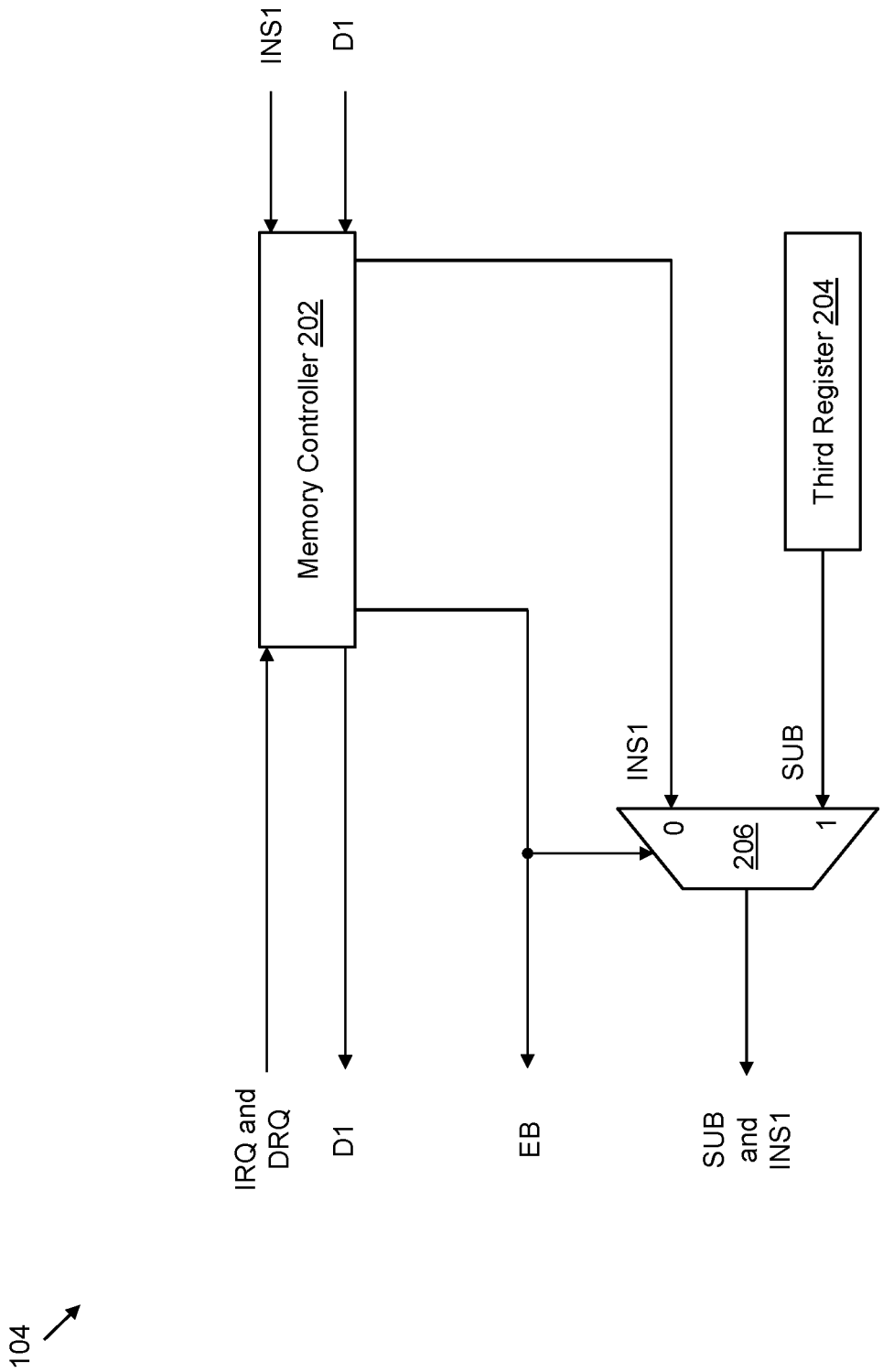
FIG. 2 illustrates a schematic circuit diagram of an error control circuit of the IC of FIG. 1 in accordance with an embodiment of the present disclosure.

FIG. 2 illustrates a schematic circuit diagram of the error control circuit 104 in accordance with an embodiment of the present disclosure. The error control circuit 104 may include a memory controller 202, a third register 204, and a multiplexer 206.

The memory controller 202 may be coupled to the processor 102, the first memory 106, the second memory 108, the system controller 110, the logic gate 118, and the multiplexer 206. The memory controller 202 may include suitable circuitry that may be configured to perform one or more operations. For example, the memory controller 202 may be configured to receive the instruction request IRQ from the processor 102. Based on the instruction request IRQ, the memory controller 202 may be configured to retrieve various instructions from the first memory 106 in a sequential manner. For example, the memory controller 202 may be configured to initially retrieve the first instruction INS1 from the first memory 106. Further, the memory controller 202 may be configured to determine whether the first instruction INS1 is erroneous or error-free.

The memory controller 202 may be further configured to generate the error bit EB. Based on the determination that the first instruction INS1 is erroneous, the error bit EB is asserted. Conversely, the error bit EB is de-asserted based on the determination that the first instruction INS1 is error-free. As it is assumed that the first instruction INS1 is erroneous, the error bit EB is asserted. Based on the assertion of the error bit EB, the substitute instruction SUB is provided to the processor 102 as the response to the instruction request IRQ. Further, the memory controller 202 may be configured to provide the asserted error bit EB to the system controller 110 and the logic gate 118. Based on the error bit EB, the execution of the first thread TH1 may be suspended or may remain unaltered.

When the execution of the first thread TH1 is suspended, the execution of the second thread TH2 is initiated and the memory controller 202 may be further configured to receive another instruction request from the processor 102 to retrieve various instructions of the second thread TH2 from the first memory 106. For each instruction of the second thread TH2, the memory controller 202 may operate in a similar manner as for the first instruction INS1. Further, after the execution of the first thread TH1 is suspended, the first thread TH1 is disabled, the erroneous first instruction INS1 is corrected, and the first thread TH1 is re-enabled.

The re-enabled first thread TH1 may then be scheduled for execution at the processor 102 after the execution of the second thread TH2 is complete. In such a scenario, the processor 102 may regenerate the instruction request IRQ and provide the instruction request IRQ to the memory controller 202. The memory controller 202 may again retrieve the first instruction INS1 from the first memory 106 and determine whether the first instruction INS1 is erroneous or error-free. As the first instruction INS1 is corrected, the memory controller 202 may generate the error bit EB in a de-asserted state and the first instruction INS1 is provided to the processor 102 for execution. In such a scenario, the execution of the first thread TH1 remains unaltered.

During the execution of the first instruction INS1, the memory controller 202 may be further configured to receive the data request DRQ from the processor 102. Based on the data request DRQ, the memory controller 202 may be further configured to retrieve the first data D1 of the first data set DS1 from the second memory 108. The memory controller 202 may be further configured to determine whether the first data D1 is erroneous or error-free. As it is assumed that the first data D1 is erroneous, the memory controller 202 may be further configured to generate another error bit (such as the error bit EB) in an asserted state and provide the first data D1 to the processor 102. Based on the erroneous first data D1, the execution of the first thread TH1 may be suspended or may remain unaltered.

When the execution of the first thread TH1 is suspended, the execution of a subsequent thread of the plurality of threads is initiated and the first thread TH1 is disabled. After the first thread TH1 is disabled, the erroneous first data D1 is corrected and the first thread TH1 is re-enabled. When the re-enabled first thread TH1 is again scheduled for execution at the processor 102, the processor 102 may regenerate the instruction request IRQ and provide the instruction request IRQ to the memory controller 202. In such a scenario, as the first instruction INS1 and the first data D1 are corrected, the execution of the first instruction INS1 may be successful. Further, after the first instruction INS1 is executed successfully, the memory controller 202 may retrieve a subsequent instruction of the first thread TH1 from the first memory 106 and determine whether the retrieved instruction is erroneous or error-free. Thus, each remaining instruction of the first thread TH1 may be executed in a manner similar to the first instruction INS1.

The third register 204 may be coupled to the multiplexer 206. The third register 204 may be configured to store the substitute instruction SUB. The substitute instruction SUB may be stored in the third register 204 during the boot-up of the IC 100 by the core circuit.

The multiplexer 206 may be coupled to the memory controller 202, the third register 204, and the processor 102. The multiplexer 206 may be configured to receive the first instruction INS1 and the error bit EB from the memory controller 202. Further, the multiplexer 206 may be configured to receive the substitute instruction SUB from the third register 204. Based on the error bit EB, the multiplexer 206 may be further configured to provide the first instruction INS1 or the substitute instruction SUB to the processor 102. Based on the assertion of the error bit EB, the multiplexer 206 may provide the substitute instruction SUB to the processor 102. Alternatively, based on the de-assertion of the error bit EB, the multiplexer 206 may provide the first instruction INS1 to the processor 102.

For each other instruction, the multiplexer 206 may receive the instruction and the associated error bit from the memory controller 202 and the substitute instruction SUB from the third register 204. Further, based on the received error bit, the multiplexer 206 may provide the retrieved instruction or the substitute instruction SUB to the processor 102.

Although FIG. 2 illustrates that the error control circuit 104 includes a single register storing one substitute instruction, the scope of the present disclosure is not limited to it. In various other embodiments, the error control circuit 104 may include various registers storing various substitute instructions, and various multiplexers for providing different substitute instructions to the processor 102 in place of the erroneous thread instructions.

Figure 3A:
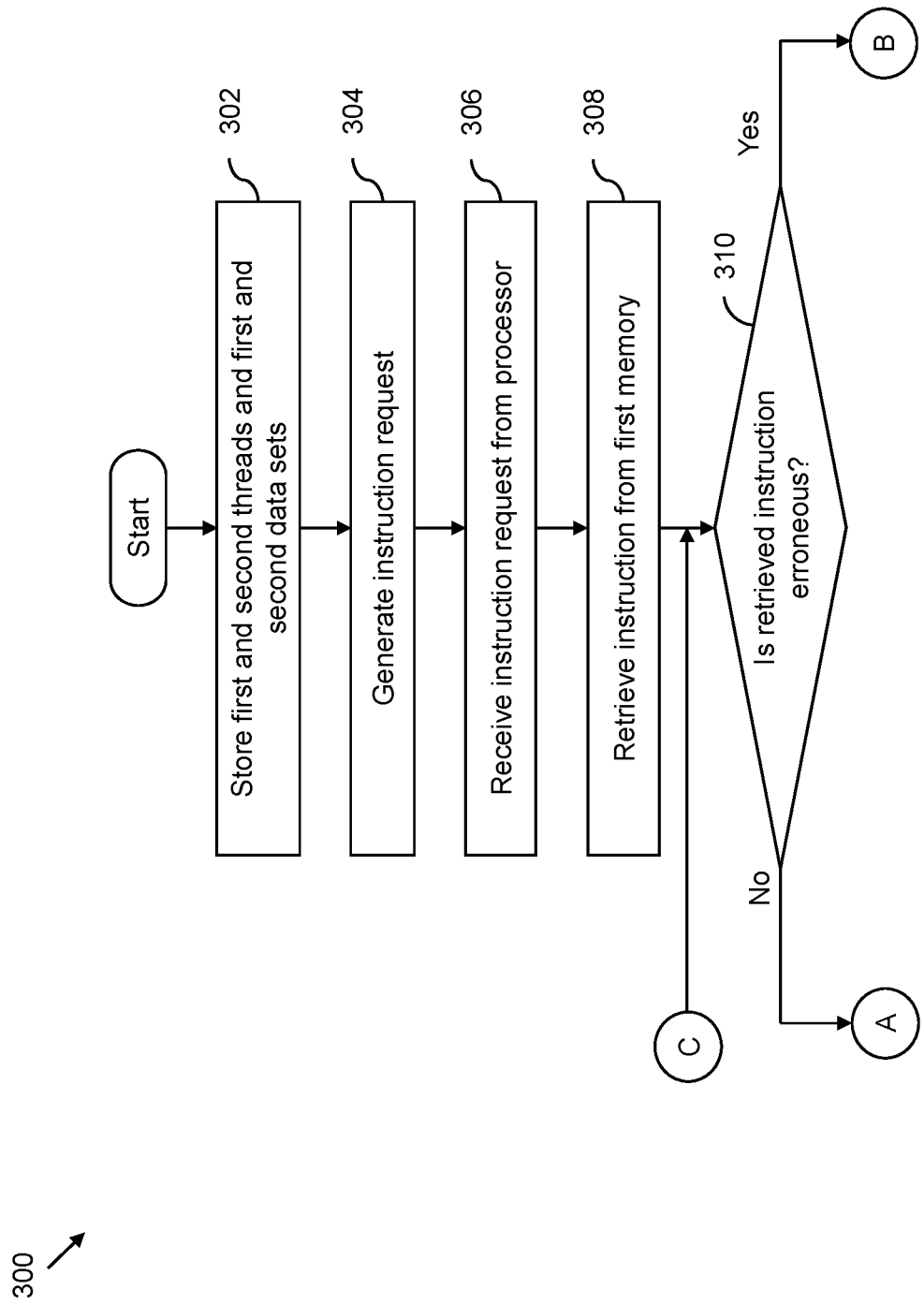
FIGS. 3A-3D, collectively, represents a flowchart that illustrates a memory error management method in accordance with an embodiment of the present disclosure.

FIGS. 3A-3D, collectively, represents a flowchart 300 that illustrates a memory error management method in accordance with an embodiment of the present disclosure. The memory error management method may be implemented by the IC 100 to manage memory errors occurring in the first and second memories 106 and 108. Referring now to FIG. 3A, at step 302, the first memory 106 may store the first and second threads TH1 and TH2, and the second memory 108 may store the first and second data sets DS1 and DS2 associated with the first and second threads TH1 and TH2, respectively.

At step 304, the processor 102 may generate, when the first thread TH1 is scheduled for execution, the instruction request IRQ to retrieve the one or more instructions of the first thread TH1 (e.g., the first set of instructions). At step 306, the error control circuit 104 may receive the instruction request IRQ from the processor 102. At step 308, the error control circuit 104 may retrieve one instruction (e.g., the first instruction INS1) from the first memory 106 based on the instruction request IRQ. At step 310, the error control circuit 104 may determine whether the retrieved instruction (e.g., the first instruction INS1) is erroneous or error-free. If at step 310, the error control circuit 104 determines that the retrieved instruction is error-free, step 312 is performed.

Figure 3B:
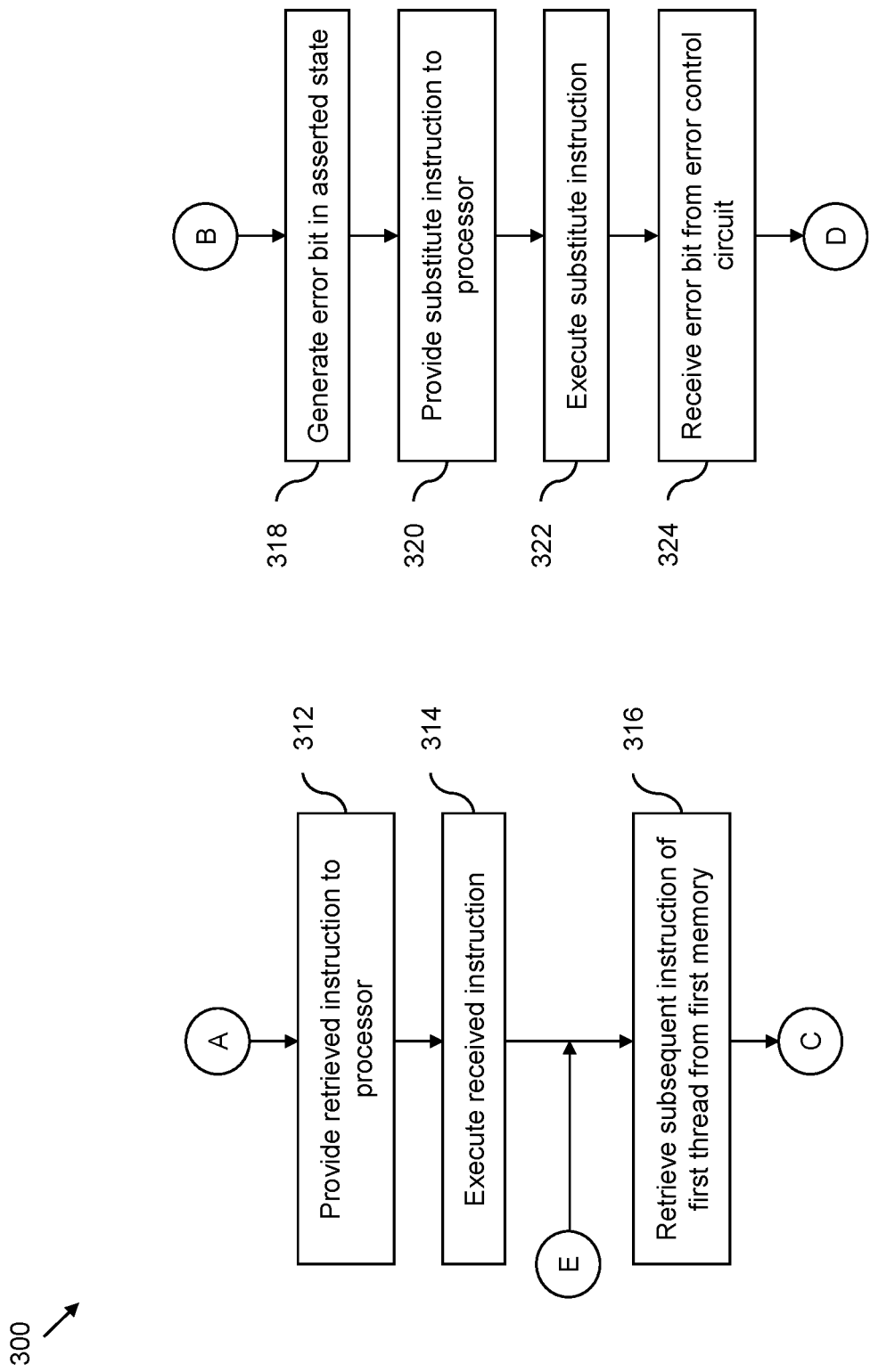

Referring now to FIG. 3B, at step 312, the error control circuit 104 may provide the retrieved instruction (e.g., the first instruction INS1) to the processor 102. At step 314, the processor 102 may execute the received instruction (e.g., the first instruction INS1). The execution of the first instruction INS1 may be successful or unsuccessful. At step 316, based on the successful execution of the first instruction INS1, the error control circuit 104 may retrieve a subsequent instruction of the first thread TH1 from the first memory 106. Step 310 is performed after step 316.

If at step 310, the error control circuit 104 determines that the first instruction INS1 is erroneous, step 318 is performed. At step 318, the error control circuit 104 may generate the error bit EB in an asserted state. At step 320, the error control circuit 104 may provide the substitute instruction SUB to the processor 102. At step 322, the processor 102 may execute the substitute instruction SUB. Thus, the operational failure of the processor 102 is prevented by the replacement of the erroneous first instruction INS1 with the substitute instruction SUB. At step 324, the system controller 110 and the logic gate 118 may receive, from the error control circuit 104, the error bit EB that is indicative of the erroneous first instruction INS1.

Figure 3C:
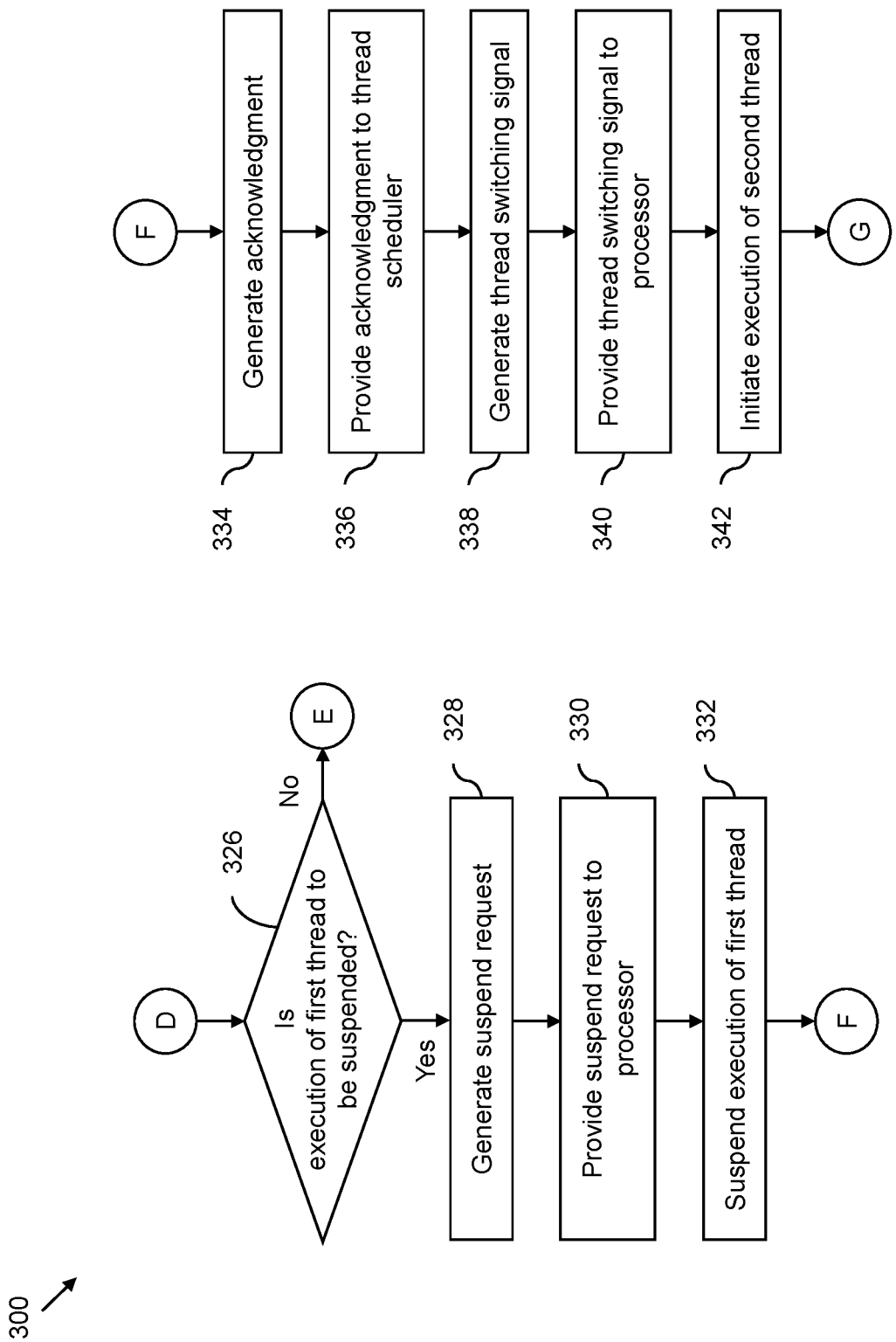

Referring now to FIG. 3C, at step 326, the system controller 110 or the first suspension control bit SC1 may determine whether the execution of the first thread TH1 is to be suspended. If at step 326, it is determined that the execution of the first thread TH1 is to remain unaltered, step 316 is performed. If at step 326, it is determined that the execution of the first thread TH1 is to be suspended, step 328 is performed.

At step 328, the thread scheduler 120 may generate the suspend request SRQ to suspend the execution of the first thread TH1. The suspend request SRQ may be generated based on the assertion of the first trigger bit TG1 generated by the system controller 110. Alternatively, the suspend request SRQ may be generated based on the assertion of the second trigger bit TG2 generated by the logic gate 118 (e.g., the assertion of the first suspension control bit SC1 stored in the first register 112 and the de-assertion of the second suspension control bit SC2 stored in the second register 114). At step 330, the thread scheduler 120 may provide the suspend request SRQ to the processor 102. At step 332, the processor 102 may suspend the execution of the first thread TH1. At step 334, the processor 102 may generate the acknowledgment ACK indicative of the successful suspension of the execution of the first thread TH1. At step 336, the processor 102 may provide the acknowledgment ACK to the thread scheduler 120.

At step 338, the thread scheduler 120 may generate the thread switching signal TSW based on the acknowledgment ACK. At step 340, the thread scheduler 120 may provide the thread switching signal TSW to the processor 102. At step 342, the processor 102 may initiate the execution of the second thread TH2 based on the thread switching signal TSW.

Figure 3D:
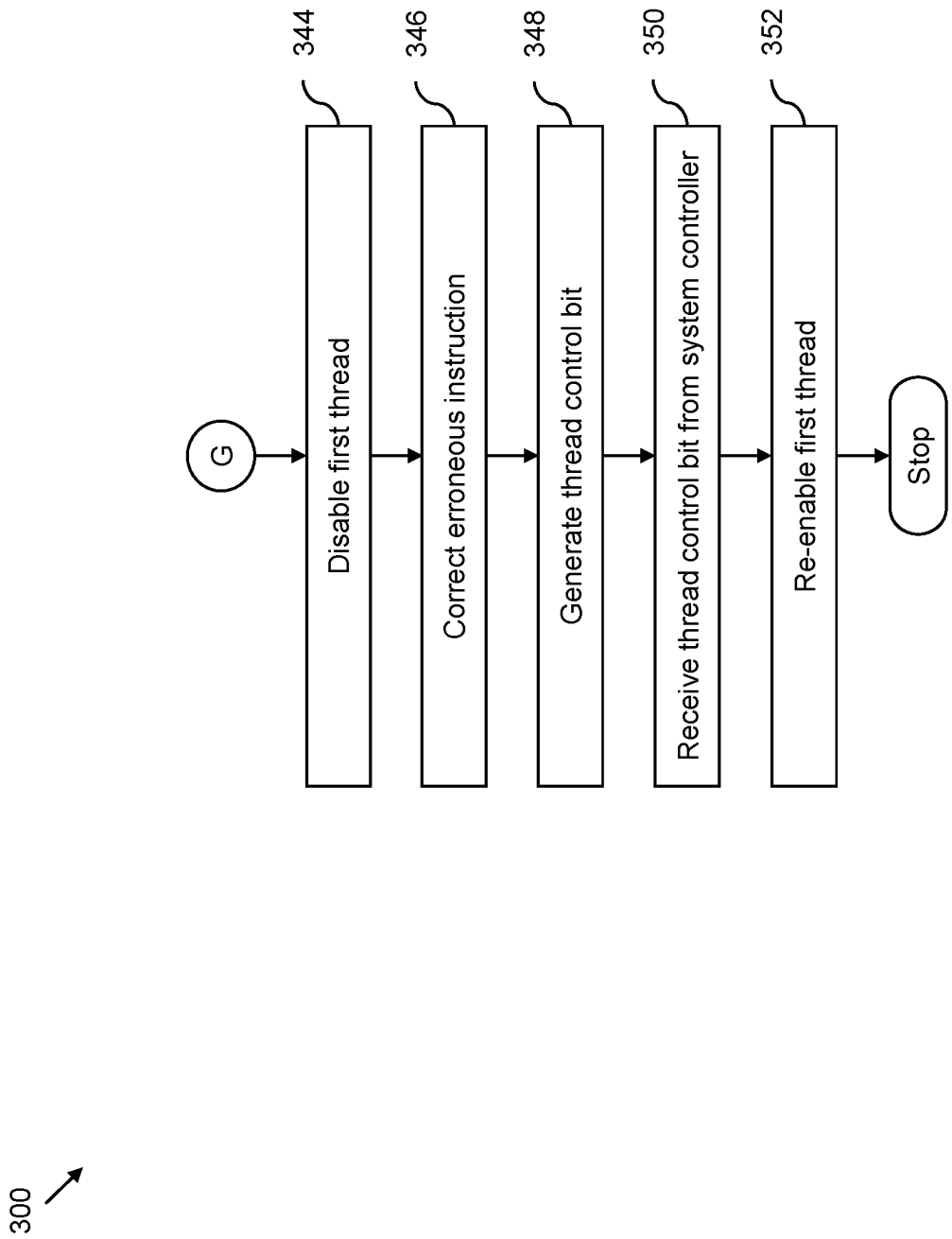

Referring now to FIG. 3D, at step 344, the thread scheduler 120 may disable the first thread TH1 based on the acknowledgment ACK. At step 346, the system controller 110 may correct the erroneous instruction (e.g., the erroneous first instruction INS1). At step 348, the system controller 110 may generate the thread control bit TCT indicative of the successful correction of the erroneous first instruction INS1. At step 350, the thread scheduler 120 may receive the thread control bit TCT from the system controller 110. At step 352, the thread scheduler 120 may re-enable the first thread TH1 based on the thread control bit TCT. To re-enable the first thread TH1, the thread scheduler 120 may modify the context associated with the first thread TH1.

The flowchart 300 describes the management of erroneous instruction (e.g., the first instruction INS1). The re-enabled first thread TH1 may then be scheduled for execution at the processor 102 after the execution of the second thread TH2 is complete. In such a scenario, as the first instruction INS1 is corrected, the first instruction INS1 is provided to the processor 102 for execution and the execution of the first thread TH1 remains unaltered. The execution of the first instruction INS1 may be successful or unsuccessful. During the execution of the first instruction INS1, the associated data of the first data set DS1 may be retrieved from the second memory 108 and it may be determined whether the retrieved data is erroneous or error-free. If the retrieved data (e.g., the first data D1) is error-free, the first data D1 is provided to the processor 102 and the execution of the first thread TH1 remains unaltered. If the retrieved data (e.g., the first data D1) is erroneous, the first data D1 is provided to the processor 102 and the execution of the first thread TH1 may be suspended in a similar manner as described above.

After the execution of the first thread TH1 is suspended, the processor 102 may initiate the execution of a subsequent thread and the thread scheduler 120 may disable the first thread TH1 in a similar manner as described above. Further, after the first thread TH1 is disabled, the system controller 110 may correct the erroneous first data D1 and the thread scheduler 120 may re-enable the first thread TH1 based on the successful correction of the erroneous first data D1 in a similar manner as described above.

When the re-enabled first thread TH1 is again scheduled for execution, the processor 102 may regenerate the instruction request IRQ and provide the instruction request IRQ to the error control circuit 104. In such a scenario, as the first instruction INS1 and the first data D1 are corrected, the execution of the first instruction INS1 may be successful and the error control circuit 104 may retrieve a subsequent instruction of the first thread TH1 from the first memory 106.

Conventionally, to recover a processor of an integrated circuit (IC) from an operational failure experienced as a result of executing an erroneous thread, the entire IC may be reset or an IC subsystem that includes the processor may be reset. The reset of the IC subsystem or the entire IC takes up a significant amount of clock cycles. The significant turnaround time associated with the reset of the IC subsystem or the entire IC is undesirable for safety-critical applications (e.g., automotive applications). Further, the operations of all the other threads that are being executed by the processor are disrupted by an error in one thread. As a result, the throughput of the processor significantly degrades.

In the present disclosure, the replacement of the erroneous instruction (e.g., the first instruction INS1) with the substitute instruction SUB and the suspension of the execution of the erroneous thread (e.g., the first thread TH1) prevents the operational failure of the processor 102 due to memory errors. Hence, a need to reset the entire IC 100 or an IC subsystem (e.g., the processor 102) is reduced. The IC 100 may thus be implemented in the safety-critical applications. When the execution of one thread is suspended, another thread is scheduled for execution at the processor 102. As a result, the operation of the processor 102 may not be halted due to the memory errors. Further, as the entire IC 100 or the IC subsystem might not be required to be reset, the operations of other threads (e.g., the second thread TH2) associated with the processor 102 remain uninterrupted. Consequently, the throughput of the processor 102 is significantly greater than that of processors that experience operational failures due to memory errors.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The term "assert" is used to mean placing a signal in an active state. For example, for an active-low signal, the signal is at a logic low state when asserted, and for an active-high signal, the signal is at a logic high state when asserted.

The invention claimed is:

1. An integrated circuit (IC), comprising:
   a first memory configured to store a first thread, wherein the first thread comprises a set of instructions;
   a processor configured to generate an instruction request to retrieve one or more instructions of the set of instructions; and
   an error control circuit that is coupled to the first memory and the processor, and configured to:
   receive the instruction request from the processor;
   retrieve a first instruction of the set of instructions from the first memory based on the instruction request;
   determine whether the first instruction is erroneous; and
   provide, based on the determination that the first instruction is erroneous, a substitute instruction to the processor as a response to the instruction request, wherein the substitute instruction is included in an instruction set of the processor, wherein the processor is further configured to execute the received substitute instruction, and wherein after the execution of the substitute instruction, the processor is further configured to suspend an execution of the first thread based on the erroneous first instruction.

2. The IC of claim 1, further comprising a thread scheduler that is coupled to the processor, and configured to:
   generate, based on the suspension of the execution of the first thread, a thread switching signal for initiating an execution of a second thread associated with the processor, wherein the first memory is further configured to store the second thread; and
   provide the thread switching signal to the processor, wherein the processor is further configured to initiate the execution of the second thread based on the thread switching signal.

3. The IC of claim 1, further comprising a thread scheduler that is configured to disable the first thread based on the suspension of the execution of the first thread, wherein the disabling of the first thread corresponds to exclusion of the first thread from multithreading associated with the processor.

4. The IC of claim 1, further comprising (i) a thread scheduler and (ii) a system controller that is coupled to the thread scheduler,
   wherein the system controller is configured to correct the erroneous first instruction after the first thread is disabled and generate a thread control bit indicative of the successful correction of the erroneous first instruction,
   wherein the thread scheduler is further configured to receive the thread control bit from the system controller and re-enable the first thread,
   wherein the re-enabling of the first thread corresponds to inclusion of the first thread in multithreading associated with the processor, and
   wherein to re-enable the first thread, the thread scheduler is further configured to modify a context associated with the first thread.

5. The IC of claim 4, further comprising a second memory that is coupled to the error control circuit,
   wherein the second memory is configured to store a data set associated with the first thread,
   wherein based on the re-enabling of the first thread, the processor is further configured to receive the first instruction from the error control circuit and execute the received first instruction,
   wherein the error control circuit is further configured to (i) receive a data request from the processor during the execution of the first instruction, (ii) retrieve first data of the data set from the second memory based on the data request, and (iii) determine whether the first data is erroneous, and
   wherein the processor is further configured to suspend the execution of the first thread based on the erroneous first data.

6. The IC of claim 1, further comprising a thread scheduler that is coupled to the processor, and configured to generate a suspend request based on the erroneous first instruction and provide the suspend request to the processor, wherein the processor suspends the execution of the first thread in response to the suspend request.

7. The IC of claim 6, wherein the error control circuit is further configured to generate an error bit, wherein the error bit is asserted based on the determination that the first instruction is erroneous, and wherein the suspend request is generated based on the error bit.

8. The IC of claim 7, further comprising a system controller that is coupled to the error control circuit and the thread scheduler, and configured to:
receive the error bit from the error control circuit;
determine whether the execution of the first thread is to be suspended based on the assertion of the error bit;
generate a first trigger bit indicating whether the execution of the first thread is to be suspended, wherein the first trigger bit is asserted to indicate that the execution of the first thread is to be suspended; and
provide the first trigger bit to the thread scheduler, wherein the thread scheduler generates the suspend request based on the assertion of the first trigger bit.

9. The IC of claim 7, further comprising a logic gate that is coupled to the error control circuit and the thread scheduler, and configured to:
receive the error bit from the error control circuit;
receive a suspension control bit, wherein the suspension control bit is asserted to indicate that the execution of the first thread is to be suspended when the first thread is erroneous;
generate a second trigger bit based on the error bit and the suspension control bit, wherein the second trigger bit is asserted based on the assertion of each of the error bit and the suspension control bit, and wherein the second trigger bit is de-asserted based on a de-assertion of at least one of a group consisting of the error bit and the suspension control bit; and
provide the second trigger bit to the thread scheduler, wherein the thread scheduler generates the suspend request based on the assertion of the second trigger bit.

10. The IC of claim 9, further comprising a first register that is coupled to the logic gate, and configured to store the suspension control bit, wherein the suspension control bit is stored in the first register during a boot-up of the IC.

11. The IC of claim 1, wherein the error control circuit comprises a memory controller that is coupled to the first memory and the processor, and configured to:
receive the instruction request from the processor;
retrieve the first instruction from the first memory based on the instruction request;
determine whether the first instruction is erroneous; and
generate an error bit, wherein the error bit is asserted based on the determination that the first instruction is erroneous.

12. The IC of claim 11, wherein the error control circuit further comprises a multiplexer that is coupled to the memory controller and the processor, and configured to:
receive the first instruction and the error bit from the memory controller;
receive the substitute instruction; and
provide, based on the error bit, one of a group consisting of the first instruction and the substitute instruction to the processor, wherein based on the assertion of the error bit, the substitute instruction is provided to the processor.

13. The IC of claim 1, wherein the error control circuit comprises a second register that is configured to store the substitute instruction, and wherein the substitute instruction is stored in the second register during a boot-up of the IC.

14. The IC of claim 1, wherein the first instruction is erroneous as a result of a memory error in the first memory.

15. A memory error management method, comprising:
storing, by a first memory of an integrated circuit (IC), a first thread, wherein the first thread comprises a set of instructions;
generating, by a processor of the IC, an instruction request to retrieve one or more instructions of the set of instructions;
receiving, by an error control circuit of the IC, the instruction request from the processor;
retrieving, by the error control circuit, a first instruction of the set of instructions from the first memory based on the instruction request;
determining, by the error control circuit, whether the first instruction is erroneous;
providing, by the error control circuit, based on the determination that the first instruction is erroneous, a substitute instruction to the processor as a response to the instruction request, wherein the substitute instruction is included in an instruction set of the processor;
executing, by the processor, the substitute instruction; and
suspending, by the processor, after the substitute instruction is executed, an execution of the first thread based on the erroneous first instruction.

16. The memory error management method of claim 15, further comprising:
generating, by a thread scheduler of the IC, based on the suspension of the execution of the first thread, a thread switching signal for initiating an execution of a second thread associated with the processor;
providing, by the thread scheduler, the thread switching signal to the processor; and
initiating, by the processor, the execution of the second thread based on the thread switching signal.

17. The memory error management method of claim 15, further comprising disabling the first thread, by a thread scheduler of the IC, based on the suspension of the execution of the first thread, wherein the disabling of the first thread corresponds to exclusion of the first thread from multithreading associated with the processor.

18. The memory error management method of claim 15, further comprising:
correcting, by a system controller of the IC, the erroneous first instruction after the first thread is disabled;
generating, by the system controller, a thread control bit indicative of the successful correction of the first instruction;
receiving, by a thread scheduler of the IC, the thread control bit from the system controller; and
re-enabling the first thread, by the thread scheduler, based on the thread control bit, wherein the re-enabling of the first thread corresponds to inclusion of the first thread in multithreading associated with the processor.

19. The memory error management method of claim 15, further comprising:
generating, by a thread scheduler of the IC, a suspend request based on the erroneous first instruction; and
providing, by the thread scheduler, the suspend request to the processor, wherein the execution of the first thread is suspended by the processor in response to the suspend request.

20. An integrated circuit (IC), comprising:
a first memory and a second memory configured to store a first thread and a data set associated with the first thread, respectively, wherein the first thread comprises a set of instructions;

a processor configured to generate an instruction request to retrieve one or more instructions of the set of instructions; and an error control circuit that is coupled to the first memory, the second memory, and the processor, and configured to:
receive the instruction request from the processor;
retrieve a first instruction of the set of instructions from the first memory based on the instruction request;
determine whether the first instruction is erroneous;
provide, based on the determination that non-data in the first instruction is erroneous, a substitute instruction to the processor as a response to the instruction request, wherein the processor is further configured to execute the received substitute instruction and after execution of the substitute instruction, suspend an execution of the set of instructions based on the erroneous first instruction;
receive, during the execution of the first instruction, a data request from the processor;
retrieve first data of the data set from the second memory based on the data request; and
determine whether the first data is erroneous, wherein the processor is further configured to suspend an execution of the first thread based on the erroneous first data.

21. The IC of claim 1, wherein after the execution of the substitute instruction, a system controller is further configured to correct the first instruction of the first thread which is erroneous while a second thread is being executed by the processor; and the processor is further configured to execute the first thread with the corrected instruction.

22. The IC of claim 21, wherein the correction of the first instruction of the first thread is erroneous based on an indication by an error correction code (ECC).

23. The memory error management method of claim 15, further comprising after the substitute instruction is executed, (i) correcting the first instruction of the first thread which is erroneous while a second thread is being executed by the processor; and (ii) executing the first thread with the corrected instruction.

24. The memory error management method of claim 23, wherein the correction of the first instruction of the first thread is erroneous based on an indication by an error correction code (ECC).

25. The IC of claim 20, further comprising a system controller configured to correct the first instruction of the first thread which is erroneous after the execution of the substitute instruction and while a second thread is being executed by the processor; and the processor is further configured to execute the first thread with the corrected instruction after the execution of the substitute instruction.

26. The IC of claim 25, wherein the correction of the first instruction of the first thread is erroneous based on an indication by an error correction code (ECC).

* * * * *